(12) United States Patent
Kato

(10) Patent No.: US 7,360,105 B2
(45) Date of Patent: Apr. 15, 2008

(54) COMPUTER PERIPHERAL USED BY BEING CONNECTED TO A HOST COMPUTER TO REDUCE POWER CONSUMPTION IN STANDBY MODE

(75) Inventor: Masaki Kato, Yamagata (JP)

(73) Assignee: Mitsumi Electric Co., Ltd., Yamagata (JP)

( * ) Notice: Subject to any disclaimer, the term of this patent is extended or adjusted under 35 U.S.C. 154(b) by 353 days.

(21) Appl. No.: 11/066,803

(22) Filed: Feb. 25, 2005

(65) Prior Publication Data

US 2006/0031693 A1   Feb. 9, 2006

(30) Foreign Application Priority Data

Aug. 3, 2004   (JP) .............................. 2004-227201

(51) Int. Cl.
*G06F 1/32* (2006.01)
(52) U.S. Cl. ...................................... 713/323; 713/310
(58) Field of Classification Search ................ 713/323, 713/310
See application file for complete search history.

(56) References Cited

U.S. PATENT DOCUMENTS

| | | | | |
|---|---|---|---|---|
| 5,675,813 A | * | 10/1997 | Holmdahl | 713/310 |
| 6,256,682 B1 | * | 7/2001 | Gudan et al. | 710/14 |
| 6,671,814 B1 | * | 12/2003 | Kubo et al. | 713/324 |
| 7,032,120 B2 | * | 4/2006 | El-Kik et al. | 713/320 |

OTHER PUBLICATIONS

Richard T. Vannoy II—"Pull-up Resistor"—Oct. 18, 1996—Google Groups: sci.electronics.basics.*

* cited by examiner

*Primary Examiner*—Thuan Du
(74) *Attorney, Agent, or Firm*—Patents+TMS, P.C.

(57) ABSTRACT

A computer peripheral that can be connected to a host computer receives a power supply from the host computer. The computer peripheral includes: a USB connector 1 for connecting the computer peripheral to the host computer; a first circuit (FDD control IC 2) which directly receives the power supply from the host computer via the USB connector 1; and a second circuit (spindle motor driver 6) which receives the power supply from the computer via the first circuit. The first circuit includes a pull-up circuit 3 for maintaining a higher voltage level than that of the second circuit and a switch 32 for turning ON/OFF the pull-up circuit 3. The first circuit stops supplying the power supply from the first circuit to the second circuit via the switch 32 in the case where the first circuit receives a suspend signal from the host computer to become a standby mode.

7 Claims, 2 Drawing Sheets

COMPUTER PERIPHERAL USED BY BEING CONNECTED TO A HOST COMPUTER TO REDUCE POWER CONSUMPTION IN STANDBY MODE

This application claims priority to Japanese Patent Application No. 2004-227201 filed Aug. 3, 2004, which is hereby expressly incorporated by reference herein in its entirety.

BACKGROUND OF THE INVENTION

1. Field of the Invention

The present invention relates to a computer peripheral. More specifically, the present invention relates to a computer peripheral that is connected to a computer (host computer) when using it, and can reduce power consumption at a standby mode of the computer peripheral.

2. Description of the Prior Art

Various devices such as a floppy disk drive (FDD), an optical disc drive are used as a computer peripheral. Some of the various devices may be embedded in a host computer and used as an internal device, and other of the various devices may be externally installed outside a computer and used as an external device.

Some computer peripherals have no power source therein and can operate by receiving a power supply from a computer (host computer). For example, most computer peripherals connected to a host computer via a universal serial bus (USB) cable generally operate by receiving the power supply from the host computer.

In such a conventional computer peripheral, a constant current flows at both an operation mode and a standby mode of the computer peripheral. For example, in case of a FDD that receives a power supply from a host computer via a USB connection, a current constantly flows into a motor driver IC for a spindle motor, thereby consuming electric power at a standby mode in vain.

As described above, there was a problem that a current equal to the current flowing at the operation mode constantly flows even at the standby mode in such a conventional computer peripheral, thereby using the ability to supply electric power of a host computer in vain.

Further, there was a problem that in the case where the total amount of current which computer peripherals require exceeds standards of power consumption for the USB or the like, this excess gives rise to an overload to a power supply unit of the host computer or an incorrect operation of the computer peripheral.

SUMMARY OF THE INVENTION

In order to solve the problems described above, it is therefore an object of the present invention to provide a computer peripheral which can reduce power consumption of the computer peripheral used by being connected to a host computer.

The present invention is directed to a computer peripheral adapted to be connected to a host computer. The computer peripheral of the present invention is adapted to receive a power supply from the host computer. The computer peripheral includes: a connector for connecting the computer peripheral to the host computer; a first circuit which directly receives the power supply from the host computer via the connector; and a second circuit which receives the power supply from the computer via the connector and the first circuit. The first circuit includes a pull-up circuit for maintaining a higher voltage level of the first circuit in comparison with that of the second circuit and a switch for turning ON or OFF the pull-up circuit. Further, the first circuit stops supplying the power supply from the first circuit to the second circuit via the switch in the case where the first circuit receives a suspend signal from the host computer to become a standby mode.

According to the computer peripheral of the present invention, since the power supply from the first circuit to the second circuit is stopped at the standby mode, it is possible to prevent useless power consumption of the second circuit. In this case, a pull-up circuit is generally used to keep (hold) the potential of the first circuit side to a high level between the first circuit such as a control IC and the second circuit such as a motor driver in such a computer peripheral. In the present invention, since a switch for turning ON or OFF of the pull-up circuit is provided in the first circuit and the first circuit is constructed so as to be able to control the ON or OFF of the pull-up circuit, it is possible to achieve the effects described above with a simple configuration.

In the computer peripheral of the present invention, it is preferable that the first circuit further comprises a ROM for storing firmware for the computer peripheral and is constructed to operate on the basis of the firmware, and that the switch is turned ON to continue to supply the power from the first circuit to the second circuit in the case where the suspend signal is not received from the host computer, and the switch is turned OFF to stop supplying the power from the first circuit to the second circuit in the case where the suspend signal is received from the host computer. Since the computer peripheral of the present invention can be achieved by software processing of the firmware in this way, it is possible to apply the present invention to various types of computer peripherals easily.

Further, in the computer peripheral of the present invention, it is preferable that the computer peripheral further includes a motor, and the first circuit is a circuit for controlling the computer peripheral and the second circuit is a driver circuit for controlling the motor. Since the driver circuit for controlling the motor particularly consumes a large amount of electric power constantly, the present invention can be applied thereto effectively.

Moreover, in the computer peripheral of the present invention, it is preferable that the connector includes a USB connector. In the case of the USB connection, since the upper limit is set up on the standards for power consumption, the present invention can be applied thereto effectively.

In the computer peripheral of the present invention, it is preferable that the computer peripheral includes a floppy disk drive and an optical disc drive.

BRIEF DESCRIPTION OF THE DRAWINGS

The foregoing and other objects, features and advantages of the present invention will become more readily apparent from the following detailed description of preferred embodiments of the invention which proceeds with reference to the accompanying drawings.

DETAILED DESCRIPTION OF THE INVENTION

Figure 1:
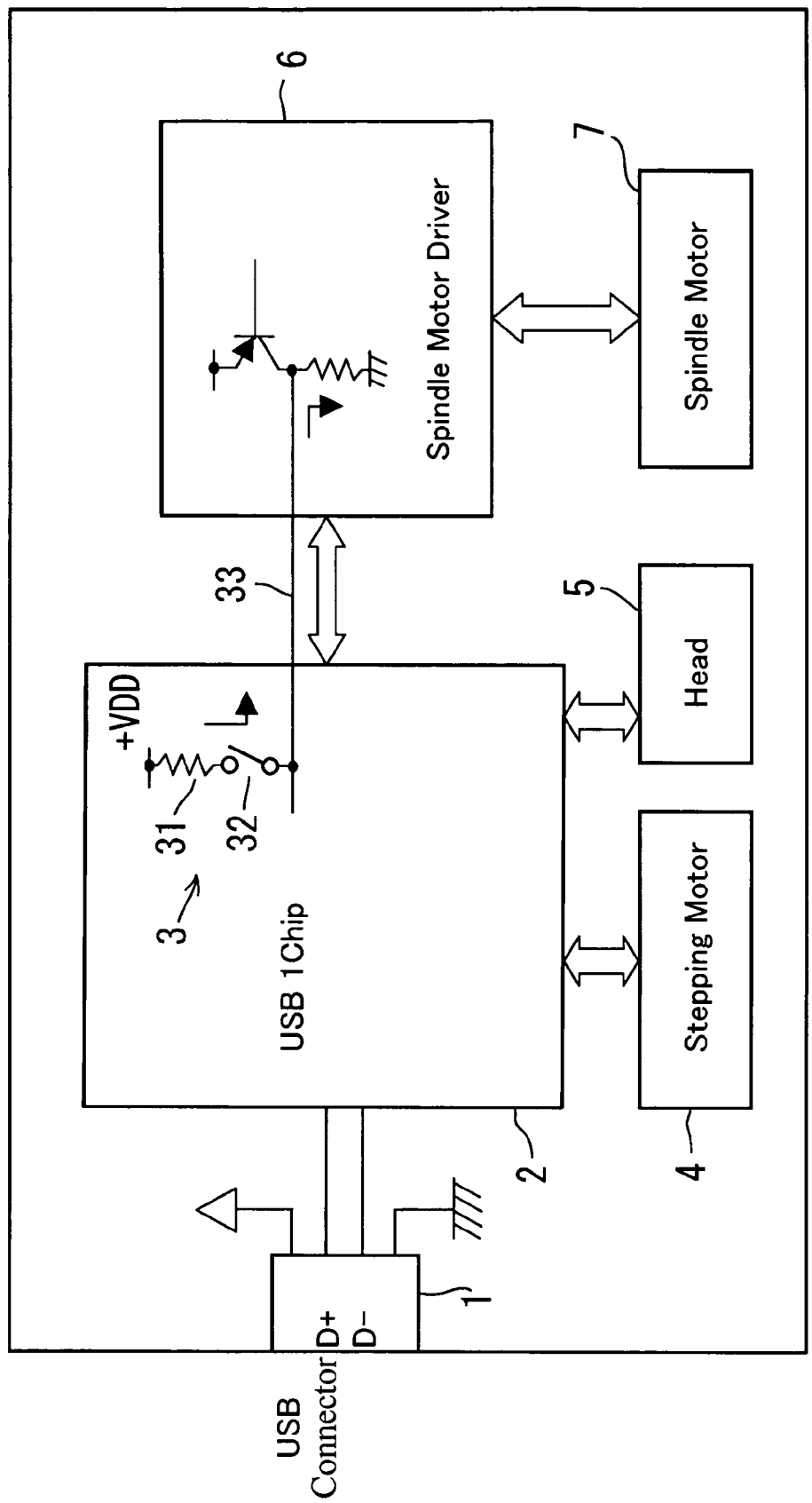
FIG. 1 is a block diagram of a FDD as a computer peripheral in an embodiment according to the present invention.

A detailed description will now be given for a computer peripheral of the preferred embodiment according to the present invention with reference to the accompanying drawings. FIG. 1 is a block diagram of a FDD connected to a host computer (not shown) via a USB connection.

The FDD is an external FDD that accepts the USB connection. The FDD is mainly constructed from a USB connector 1; a FDD control IC 2 that is a 1-chip IC connected to the USB connector 1; a stepping motor 4; a magnetic head 5; a spindle motor driver 6; and a spindle motor 7. The FDD control IC 2 is a large-scale integration (LSI) in which various circuits such as a read/write circuit required to drive the FDD, a central processing unit (CPU), a USB controller, a floppy disk controller, a stepping motor driver, a random access memory (RAM), a read only memory (ROM) and a clock generator are integrated. The FDD control IC 2 also has firmware for the FDD, which is stored in the ROM.

In the present embodiment, the FDD control IC 2 receives a power supply from a host computer via the USB connector 1, while the spindle motor driver 6 and the spindle motor 7 receive the power supply from the host computer via the FDD control IC 2. When a suspend signal is inputted from the host computer into the FDD, the FDD control IC 2 enters a standby mode. Further, in the present embodiment, the FDD control IC 2 corresponds to a first circuit, and a circuit constituted from the spindle motor driver 6 and the spindle motor 7 corresponds to a second circuit.

In the FDD of the present embodiment, the spindle motor driver 6 and the spindle motor 7 consume a large amount of electric power at an operation mode, but it is no need to supply power to the spindle motor driver 6 and the spindle motor 7 at a standby mode. Thus, in the present embodiment, the spindle motor driver 6 (and the spindle motor 7) fits the second circuit in which a power supply thereto can be controlled at the standby mode of the FDD. A motor driver circuit for controlling a motor, such as the spindle motor driver 6, may be mentioned as a typical example of the second circuit in the computer peripheral of the present invention.

The circuit for controlling the current flowing into the spindle motor driver 6 (herein, current control circuit) is provided in the FDD control IC 2, that is, the first circuit. The current control circuit controls ON or OFF of an electronic switch 32 in a pull-up circuit 3 which is provided in the FDD control IC 2. The pull-up circuit 3 is connected to a positive power supply +VDD, into which the host computer feeds via the USB connector 1, through a resistive element 31.

The pull-up circuit 3 ensures that the FDD control IC 2 side constantly becomes a high level even though a signal line 33 between the FDD control IC 2 and the spindle motor driver 6 becomes a high impedance state. Namely, in the case where the signal line 33 between the FDD control IC 2 and the spindle motor driver 6 is directly opened or closed by means of a switch, the circuit becomes an open state when the signal line 33 is opened, whereby a potential difference between the FDD control IC 2 and the spindle motor driver 6 becomes an unstable state. Therefore, by inserting the pull-up circuit 3 between the FDD control IC 2 and the spindle motor driver 6 (actually, by inserting the pull-up circuit 3 into the FDD control IC 2), potentials of the FDD control IC 2 and the spindle motor driver 6 are stabilized at a state where the potential of the FDD control IC 2 is higher than that of the spindle motor driver 6.

The ON/OFF of the electronic switch 32 in the pull-up circuit 3 is switched in response to input logic of a suspend signal inputted from the host computer via the USB connector 1. This switching operation is carried out using the firmware stored in the ROM. In the present invention, the electronic switch 32 is provided in the pull-up circuit 3 that such a computer peripheral generally include, and the computer peripheral is controlled by controlling the electronic switch 32 by means of software, by which the power supply to the second circuit is restricted at the standby mode of the computer peripheral (FDD). Therefore, since such a current control circuit can be achieved with a simple configuration, it is possible to reduce power consumption of the computer peripheral without significant design change or increase of the manufacturing costs of existing devices.

Figure 2:
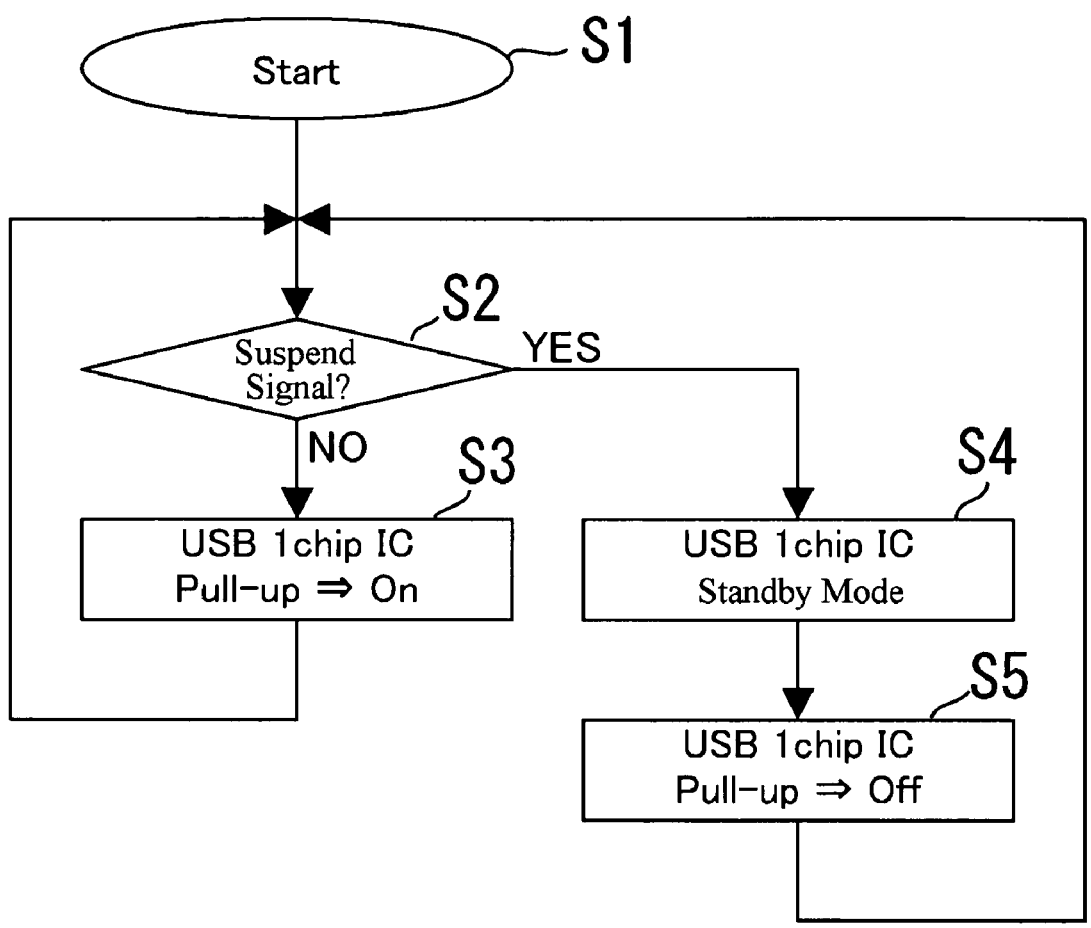
FIG. 2 is a flowchart which shows an algorithm of illustrates firmware for the computer peripheral shown in FIG. 1.

Next, the operation of the computer peripheral according to the present invention will be described with reference to a flowchart shown in FIG. 2. FIG. 2 is a flowchart which shows an algorithm of illustrates firmware for the computer peripheral shown in FIG. 1.

This program is executed whenever the FDD is connected to the host computer, that is, the FDD receives a power supply from the host computer via the USB connector 1 (Step S1). At Step S2, it is determined whether or not a suspend signal is inputted into the FDD control IC 2 from the host computer via the USB connector. In the case where it is determined that the suspend signal is not inputted, the electronic switch 32 maintains an ON state (Step S3). In this case, since the pull-up circuit 3 operates, power is supplied from the host computer to the spindle motor driver 6 and the spindle motor 7 via the USB connector 1 and the FDD control IC 2 (that is, a current flows into the spindle motor driver 6 and the spindle motor 7).

On the other hand, in the case where it is determined at Step S2 that the suspend signal is inputted into the FDD control IC 2 from the host computer via the USB connector 1, the FDD control IC 2 becomes a standby mode (Step S4), and the electronic switch 32 is turned OFF (Step S5). In this case, since the pull-up circuit 3 is cut off, a power supply to the spindle motor driver 6 and the spindle motor 7 is stopped (suspended). Therefore, it is possible to reduce power consumption of the spindle motor driver 6 and the spindle motor 7 at a standby mode.

As described above, when the computer peripheral of the present invention receives a suspend signal from the host computer, the electronic switch 32 of the pull-up circuit 3 is turned OFF, thereby stopping supplying electric power to the spindle motor driver 6 (that is, second circuit) from the FDD control IC 2 (that is, first circuit). Thus, it is possible to restrict a useless power supply to the spindle motor driver 6 at the standby mode of the FDD (computer peripheral), and this makes it possible to reduce power consumption of the whole FDD.

The present invention was described above based on the embodiment shown in the drawings, but the present invention is not limited to this embodiment, and the structure of each component (element) can be replaced by any structure capable of performing the same or a similar function. Further, any other components may be added to the present invention. In this regard, it should be noted that in the embodiment the FDD has been described as an example of a computer peripheral, but the present invention can be applied to any computer peripheral as long as such a computer peripheral can receive a power supply from a host computer. As such a computer peripheral, for example, an optical disc drive such as a CD-ROM drive and a DVD-ROM drive and a hard disc drive (HDD) may be mentioned. Further, it should be noted that in the embodiment the USB connection has been described as an example, but the present invention can be applied to any computer peripheral that utilizes a connection method in which power from a computer can be supplied to the computer peripheral. As such a connection method, for example, serial interface connection such as RS232C and the like may be mentioned.

I claim:

1. A computer peripheral used by being connected to a host computer wherein the computer peripheral is configured to receive a power supply from the host computer, the computer peripheral comprising:
   a connector for connecting the computer peripheral to the host computer;
   a first circuit which directly receives the power supply from the host computer via the connector; and
   a second circuit which receives the power supply from the host computer via the first circuit wherein the second circuit receives the power supply only from the host computer;
   wherein the first circuit comprises a pull-up circuit for maintaining a higher voltage level of the first circuit in comparison with that of the second circuit and a switch for turning ON or OFF the pull-up circuit wherein both the pull-up circuit and the switch are provided in the first circuit, and
   wherein the first circuit stops supplying the power supply from the first circuit to the second circuit via the switch in the case where the first circuit receives a suspend signal from the host computer to become a standby mode and further wherein the first circuit further comprises a ROM for storing firmware for the computer peripheral and is configured to operate the switch on the basis of the firmware so that the switch is turned ON to continue to supply power from the first circuit to the second circuit in the case where the suspend signal is not received from the host computer, and the switch is turned OFF to stop supplying the power from the first circuit to the second circuit in the case where the suspend signal is received from the host computer.

2. The computer peripheral as claimed in claim 1, further comprising a motor wherein the first circuit is a circuit for controlling the computer peripheral and the second circuit is a driver circuit for controlling the motor.

3. The computer peripheral as claimed in claim 1, wherein the connector includes a USB connector.

4. The computer peripheral as claimed in claim 1, wherein the computer peripheral is a floppy disk drive.

5. A computer peripheral used by being connected to a host computer wherein the computer peripheral is configured to receive a power supply from the host computer wherein the computer peripheral has a spindle motor for rotating a disc, the computer peripheral comprising:
   a USB connector for connecting the computer peripheral to the host computer;
   a control circuit for controlling the computer peripheral wherein the control circuit is configured to directly receive the power supply from the host computer via the USB connector; and
   a motor driver for driving the spindle motor wherein the motor driver is configured to receive the power supply from the host computer via the control circuit wherein the motor driver receives the power supply only from the host computer wherein the control circuit comprises a pull-up circuit for maintaining a higher voltage level of the control circuit in comparison with that of the motor driver and a switch for turning ON or OFF the pull-up circuit wherein both the pull-up circuit and the switch are provided in the control circuit and further wherein the control circuit stops supplying the power supply from the control circuit to the motor driver via the switch in the case where the control circuit receives a suspend signal from the host computer to become a standby mode and further wherein the control circuit further comprises a ROM for storing firmware for the computer peripheral and is configured to operate the switch on the basis of the firmware so that the switch is turned ON to continue to supply power from the control circuit to the motor driver in the case where the suspend signal is not received from the host computer, and the switch is turned OFF to stop supplying the power from the control circuit to the motor driver in the case where the suspend signal is received from the host computer.

6. The computer peripheral of claim 5 wherein the computer peripheral is a floppy disk drive.

7. The computer peripheral of claim 5 wherein the computer peripheral is an optical disk drive.

* * * * *